US010207636B1

(12) United States Patent
Surman et al.

(10) Patent No.: US 10,207,636 B1
(45) Date of Patent: Feb. 19, 2019

(54) SEATBELT STOWAGE ASSEMBLY

(71) Applicant: Ford Global Technologies, LLC, Dearborn, MI (US)

(72) Inventors: James J. Surman, Clinton Township, MI (US); Cornel Lewis Gardner, Romulus, MI (US); Benjamin Yilma, Canton, MI (US); Stuart C. Salter, White Lake, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 15/787,022

(22) Filed: Oct. 18, 2017

(51) Int. Cl.
*F21V 9/00* (2018.01)
*B60Q 3/225* (2017.01)
*B60Q 3/64* (2017.01)
*B60R 22/02* (2006.01)
*B60Q 3/82* (2017.01)

(52) U.S. Cl.
CPC ............... *B60Q 3/225* (2017.02); *B60Q 3/64* (2017.02); *B60Q 3/82* (2017.02); *B60R 22/02* (2013.01); *B60R 2022/029* (2013.01)

(58) Field of Classification Search
None
See application file for complete search history.

(56) References Cited

U.S. PATENT DOCUMENTS

| 2,486,859 | A | 11/1949 | Meijer et al. |
| 3,400,978 | A | 9/1968 | Totten |
| 4,365,285 | A | 12/1982 | Brundidge |
| 5,053,930 | A | 10/1991 | Benavides |
| 5,149,189 | A | 9/1992 | Kawamura |
| 5,434,013 | A | 7/1995 | Fernandez |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,294,990 | B1 | 9/2001 | Knoll et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |

(Continued)

FOREIGN PATENT DOCUMENTS

| CN | 101337492 A | 1/2009 |
| CN | 201169230 Y | 2/2009 |
| CN | 201193011 Y | 2/2009 |
| CN | 204127823 U | 1/2015 |
| DE | 4120677 A1 | 1/1992 |

(Continued)

*Primary Examiner* — Vip Patel
(74) *Attorney, Agent, or Firm* — Vichit Chea; Price Heneveld LLP

(57) ABSTRACT

A seatbelt stowage assembly comprises a housing including an outer rim and a cover and further defining a compartment. The housing is disposed within a headliner of a vehicle and is configured to house a seatbelt in a stowed position. The seatbelt stowage assembly also includes a light source disposed within the compartment.

20 Claims, 4 Drawing Sheets

(56) References Cited

U.S. PATENT DOCUMENTS

| | | |
|---|---|---|
| 6,990,922 B2 | 1/2006 | Ichikawa et al. |
| 7,015,893 B2 | 3/2006 | Li et al. |
| 7,131,756 B2 | 11/2006 | Leslie et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,403,479 B2 | 8/2016 | Ghannam et al. |
| 9,452,709 B2 | 9/2016 | Aburto Crespo |
| 9,463,734 B2 * | 10/2016 | Salter .................. G02B 6/0096 |
| 9,463,738 B2 | 10/2016 | Salter et al. |
| 9,568,659 B2 | 2/2017 | Verger et al. |
| 9,616,812 B2 | 4/2017 | Sawayanagi |
| 2001/0033492 A1 * | 10/2001 | Rogers .................. B60R 22/48 |
| | | 362/483 |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0052091 A1 | 3/2004 | Lee |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0296928 A1 * | 10/2015 | Krauss ............... A44B 11/2546 |
| | | 362/549 |
| 2015/0307033 A1 | 10/2015 | Preisler et al. |
| 2016/0016506 A1 | 1/2016 | Collins et al. |
| 2016/0031367 A1 * | 2/2016 | Salter .................. G02B 6/0096 |
| | | 362/583 |
| 2016/0102819 A1 | 4/2016 | Misawa et al. |
| 2016/0129830 A1 | 5/2016 | Ghannam et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2016/0362083 A1 | 12/2016 | Taylor et al. |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

US 10,207,636 B1

SEATBELT STOWAGE ASSEMBLY

FIELD OF THE INVENTION

The present disclosure generally relates to a seatbelt stowage compartment. More specifically, the present disclosure relates to a seatbelt stowage compartment including a light source.

BACKGROUND OF THE INVENTION

Seatbelt stowage compartments are often used to provide a lap belt for use by occupants of a vehicle. These compartments may include a cover with user friendly and aesthetic design. However, the compartments are often underutilized for providing other desired features such as map lights and/or ambient lighting.

SUMMARY OF THE INVENTION

According to one aspect of the present disclosure, a seatbelt stowage assembly is disclosed. The seatbelt stowage assembly includes a housing including an outer rim and a cover and defining a compartment. The housing is disposed within a headliner of a vehicle and is configured to house a seatbelt in a stowed position. A light source is disposed within the compartment.

According to another aspect of the present disclosure, a seatbelt stowage assembly is disclosed. The seatbelt stowage assembly includes a housing defining a compartment disposed within a vehicle. The compartment is configured to house a seatbelt in a stowed position. A cover assembly is operably coupled to the compartment. A light source is disposed within the compartment and is operable through a control switch.

According to yet another aspect of the present disclosure, a seatbelt stowage assembly is disclosed. The seatbelt stowage assembly includes a housing defining a compartment disposed within a vehicle. A cover plate is coupled to the compartment. A light guide is disposed around a periphery of the cover plate. A light source is disposed within the compartment. A control system is configured to vary the intensity of excitation light emitted from the light source. The compartment is configured to house a seatbelt in a stowed position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
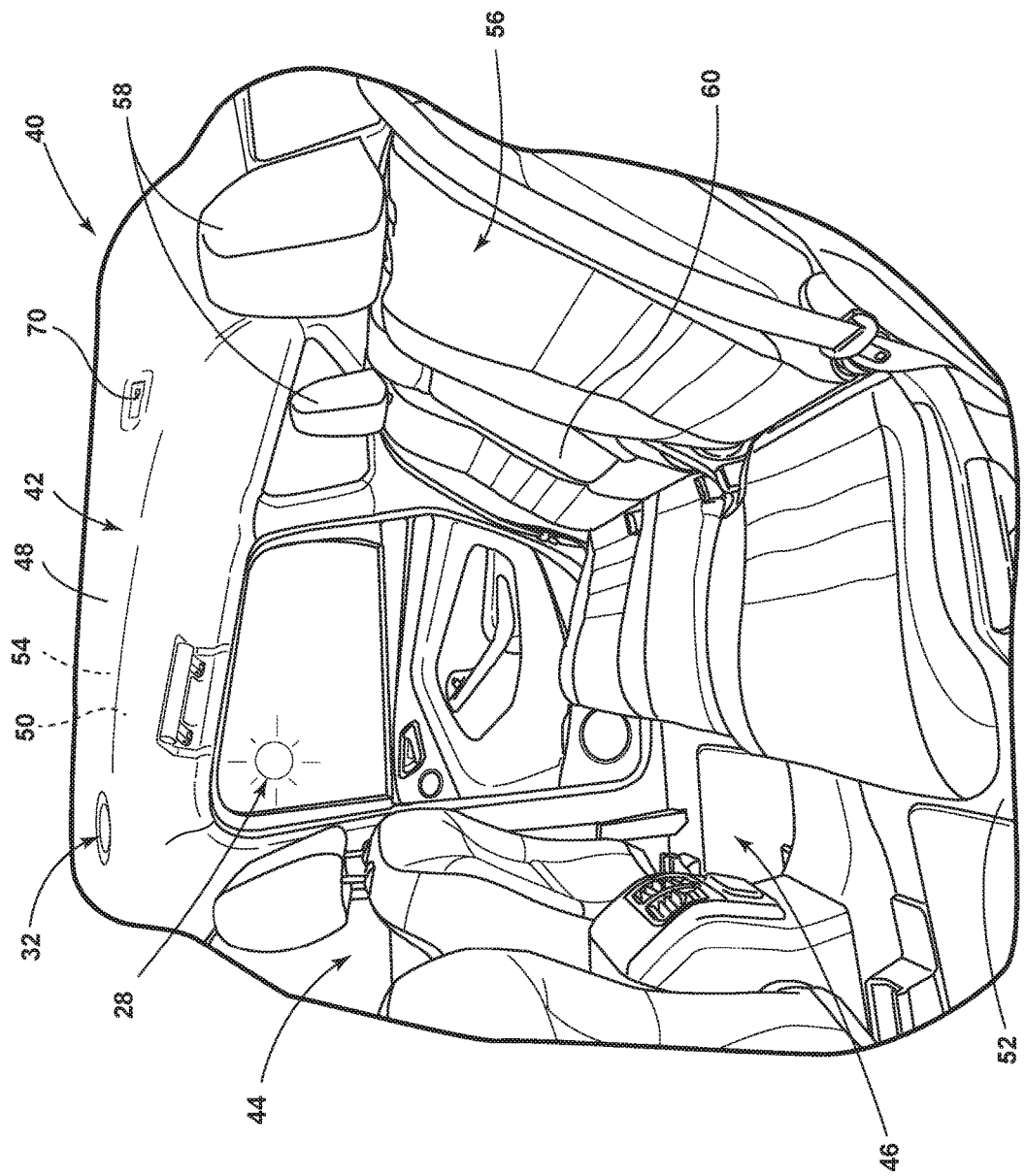
FIG. 2 is a perspective view of a vehicle interior cabin including an illuminated seatbelt stowage assembly.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1A:
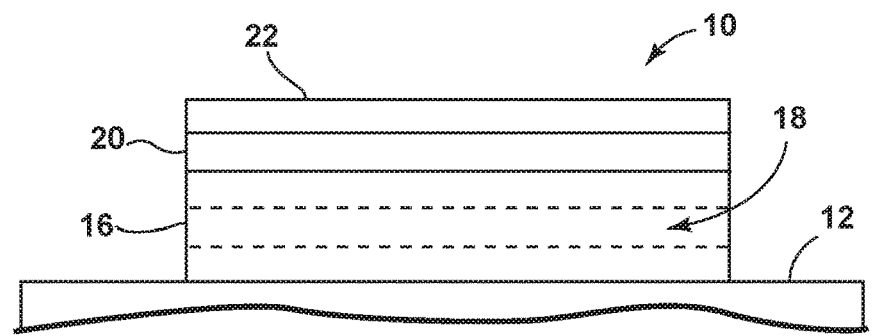
FIG. 1A is a side view of a luminescent structure rendered as a coating, according to some examples.
Figure 1B:
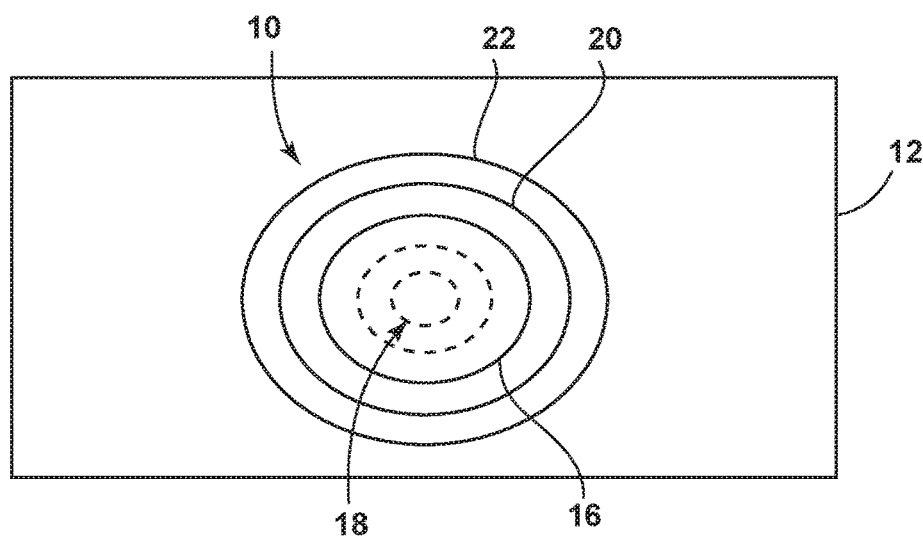
FIG. 1B is a top view of a luminescent structure rendered as a discrete particle, according to some examples.
Figure 1C:
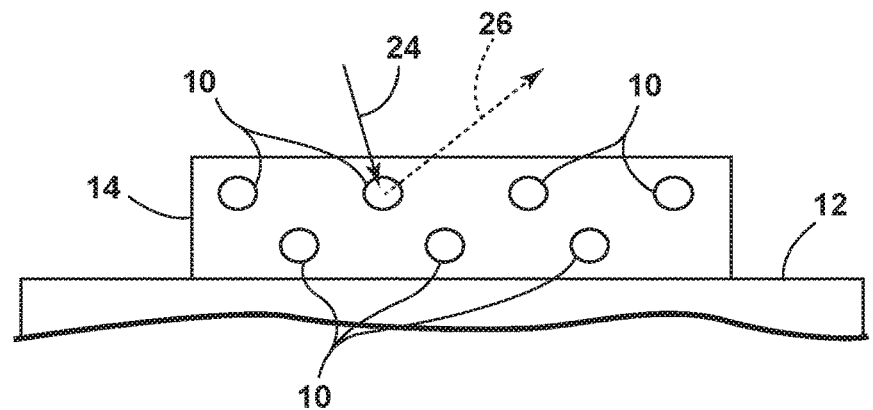
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer-wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue excitation light 24 emitted from one or more light sources (e.g., a vehicle light 32 (FIG. 2)). According to various examples, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material 18 known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the excitation light 24. The excitation light 24 may be emitted from any excitation source (e.g., any natural light source, such as the sun 28 (FIG. 2), and/or any artificial light source (e.g., a vehicle light 32 (FIG. 2)). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various examples, may be operable to emit light at or above an intensity of 0.32 mcd/m² after a period of 10 minutes. Additionally, the long-persistence luminescent material 18 may be operable to emit light above or at an intensity of 0.32 mcd/m² after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any one or more light sources (e.g., a vehicle light 32) that emit the excitation light 24, including, but not limited to, natural light sources (e.g., the sun 28) and/or any one or more artificial light sources (e.g., a vehicle light 32). The periodic absorption of the excitation light 24 from any excitation source may provide for a substantially sustained charge of the long-persistence luminescent material 18 to provide for consistent passive illumination. In various examples, a light sensor may monitor the illumination intensity of the luminescent structure 10 and actuate an excitation source when the illumination intensity falls below 0.32 mcd/m², or any other predefined intensity level.

The long-persistence luminescent material 18 may correspond to alkaline earth aluminates and silicates, for example, doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various examples, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Referring now to FIG. 2, a vehicle 40 is shown having an interior cabin 42. The interior cabin 42 may be divided into a front portion 44 and a rear portion 46. The interior cabin 42 may include a headliner 48 that is coupled to a roof 50 and a floor 52. A space 54 may be defined between the roof 50 and the headliner 48. The interior cabin 42 may also include a number of seating assemblies 56. The rear portion 46 of the interior cabin 42 includes at least one rear row of seating assemblies 56. Each row may include two outer seating assemblies 58 and a middle seating assembly 60 disposed between the outer seating assemblies 58. It will be appreciated, however, that each row may have any number of outer or middle seating assemblies 58, 60 without departing from the scope of the present disclosure. A seatbelt stowage assembly 70 is disposed within the space 54 between the roof 50 and the headliner 48 and is positioned proximate the middle seating assembly 60. The configuration of seating assemblies 56 and seatbelt stowage assemblies 70 shown in FIG. 2 is exemplary only, and it is contemplated that the configuration and dispersal of the seating assemblies 56 and respective seatbelt stowage assemblies 70 within the interior cabin 42 may be varied depending on the configuration of the vehicle 40. For example, the seating assemblies 56 and respective seatbelt stowage assemblies 70 may be disposed proximate a first rear row of seats, a second rear row of seats, and/or any other row of seats disposed within the vehicle depending on the layout of the interior cabin 42.

Figure 3:
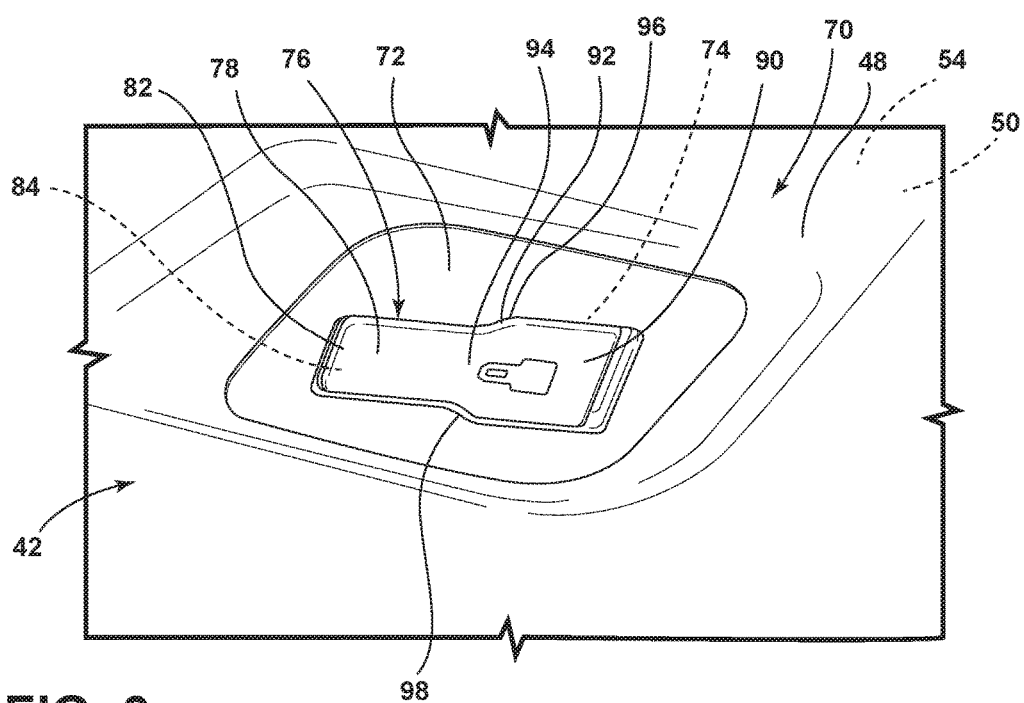
FIG. 3 is a perspective view of the seatbelt stowage assembly in a closed position.
Figure 4:
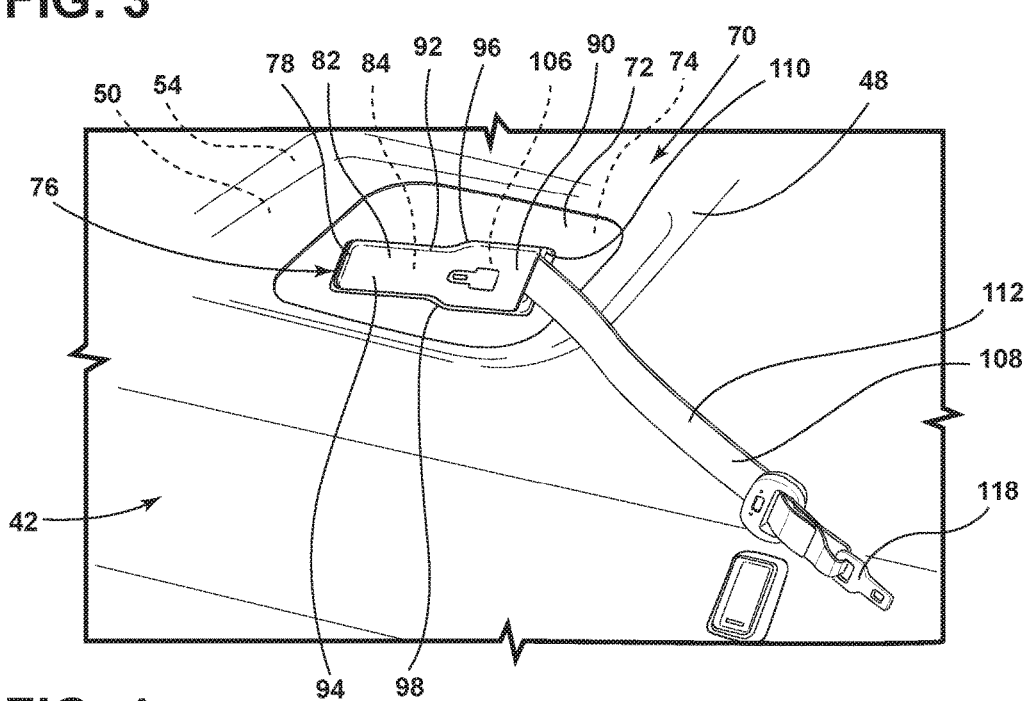
FIG. 4 is a perspective view of the seatbelt stowage assembly in a closed position with the seatbelt webbing in a deployed position.

Referring now to FIGS. 3 and 4, the seatbelt stowage assembly 70 is disposed within the space 54 between the roof 50 and the headliner 48 and may be configured to sit flush with the headliner 48 of the interior cabin 42. The seatbelt stowage assembly 70 includes a housing 76 that includes a rim 72 and a cover 78. The housing 76 also defines a compartment 74. The rim 72 is configured to couple the seatbelt stowage assembly 70 to the headliner 48 of the vehicle cabin. The rim 72 may form a geometric outline of the compartment 74 and may be of any shape and thickness desired for the configuration of the seatbelt stowage assembly 70 within the vehicle.

Still referring to FIGS. 3 and 4, the cover 78 may be movable between an open position, an intermediate position, and a closed position. An outer surface 82 of the cover 78 is configured to align with the headliner 48 of the interior cabin 42 when the cover 78 is in the closed position. The cover 78 may also include an inner surface 84 that may be configured to secure a portion of a seatbelt 112 for easy storage. The cover 78 includes a first portion 90 and a second portion 94. A perimeter lip 92 may surround the cover 78 to provide a non-linear edge for smooth closing of the cover 78 and for the general aesthetic of the seatbelt stowage assembly 70. Both the first portion 90 and the second portion 94 may be integrally formed. The first portion 90 may be wider than the second portion 94 and may include include tapered sides 96, 98. The cover 78 may be pivotally coupled to the compartment 74, the headliner 48, or the rim 72, depending on the configuration of the vehicle and the seatbelt stowage assembly 70, by using any hinge known in the art. For example, the hinge may be configured as a living hinge, a spring mechanism configured to bias the door open or closed, a soft-close mechanism, or any suitable damper configured to control the speed of closing or opening the cover. When in the closed position, the cover 78 maintains a smooth and consistent aesthetic. The cover 78 may be held in the closed position using any suitable connector known in the art including, for example, a magnetic closure, a latch closure, or a push-push lock.

Referring now to FIG. 4, the housing 76 is disposed within the space 54 between the headliner 48 and the roof 50. A seatbelt webbing retractor 106 is housed within the housing 76. The seatbelt webbing retractor 106 is configured to deploy and retract a seatbelt webbing 108 and a tongue member 118 that is operably coupled with the seatbelt webbing 108. In some examples, the seatbelt webbing retractor 106 includes a rotational reel for retracting and spooling the seatbelt webbing 108 for storage. A slot 110 is defined by the perimeter lip 92 of the first portion 90 of the cover 78 and the perimeter wall 100 of the compartment 74 such that the seat belt webbing 108 may slide through without obstruction. The seatbelt 112 may be disposed in a stowed position (FIG. 3) or a deployed position (FIG. 4). When the seatbelt is in a deployed position, the seatbelt webbing is disposed within the slot 110 configured to allow for belt adjustment. The slot 110 and the perimeter lip 92 may make it easier for users to separate the cover 78 from the compartment 74 and may give the appearance of a closed cover while the seatbelt is in use.

Figure 5:
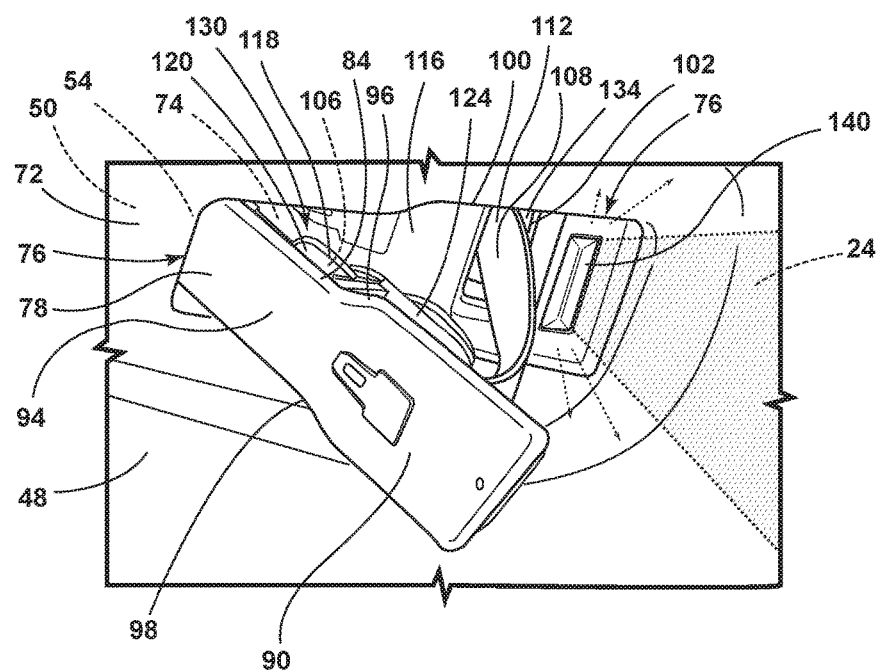
FIG. 5 is a perspective view of the seatbelt stowage assembly in an open position with the seatbelt webbing in a deployed position with a light source illuminated.

As shown in FIG. 5, a perimeter wall 100 may be integrally formed with the rim 72. The perimeter wall 100 may be coupled to an upper wall 102 to form the compartment 74 in which the seatbelt webbing retractor 106 is housed. When in the stowed position, the seatbelt webbing 108 is retracted by the seatbelt webbing retractor 106. Upon reaching a limit of retraction on the retractor, the tongue member 118 and a small portion of the seatbelt webbing 108 are configured to be swung rearwardly and upwardly for storage in a storage pocket formed by a dividing wall 116 and the inner surface 84 of the cover 78. The tongue member 118 may couple to the inner surface 84 or to the dividing wall 116 and is received so that a buckle portion 120 of the tongue member 118 is disposed along the second portion 94 of the cover 78 and a mounting portion 124 of the tongue member 118 is disposed along the first portion 90 of the cover 78. The tapered sides 96, 98 are configured to mirror the relative change in width of from the buckle portion 120 to the mounting portion 124. The tongue member 118 may be secured to the inner surface 84 of the cover 78 using any removable means known in the art including, for example, magnetic coupling, a snap coupling, or an elastic coupling. This secured configuration may additionally or alternatively be utilized for closing the cover, as the cover may include a catch configured to engage a portion of the tongue member as it retracts to bias the door in a closed position.

Referring still to FIG. 5, the dividing wall 116 extends from the perimeter wall 100 of the compartment 74. The cover 78, the perimeter wall 100, and the dividing wall 116 define a seatbelt latch assembly stowage pocket 130. The dividing wall 116 may be integrally formed with any other portion of the housing 76, or the dividing wall 116 may be formed as part of the headliner 48, depending on the configuration of the vehicle. The seatbelt latch assembly stowage pocket 130 separates the cover 78 from the seatbelt webbing retractor 106 and is configured to be a narrow open space to house the stored tongue member 118 when coupled to the inner surface 84 of the cover 78. An opening 134 is formed in the dividing wall 116 through which the seatbelt webbing 108 is run to spool within the retractor 106. The dividing wall 116 further houses a light source 140. The light source 140 may be controlled by a switch 174 (FIG. 6) such as, for example, a capacity switch, a button, a manual switch, or an automated switch. The light source 140 may be used as a map light, an ambient light, and/or for any other purpose.

Figure 6:
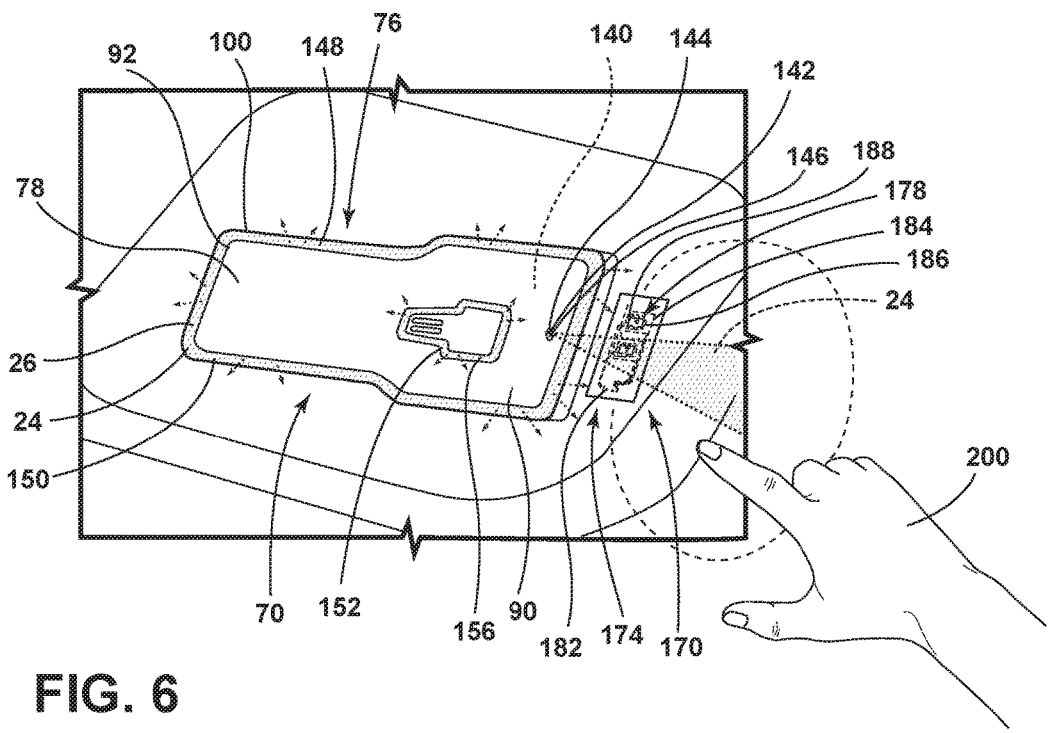
FIG. 6 is a perspective view of the seatbelt stowage assembly in a closed position with the light source to illuminate a light tube and reflective icon.

As shown in FIG. 6, the cover 78 may further define a pin spot 144 through which excitation light emitted by the light source 140 may illuminate the interior cabin 42. The pin spot 144 is disposed on the first portion 90 of the cover 78 such that, when the cover 78 is in a closed position, the pin spot 144 is located below the light source 140. Alternatively, the pin spot 144 may be illuminated by a second light source. In some instances a lens 142 may be disposed within the pin spot 144. The lens 142 may include a lens cover 146 that may be configured with a Fresnel lens, a pillow optic, and/or any other type of lens or optic that is configured to disperse, concentrate, and/or otherwise direct light emitted from the light source 140 therethrough in any desired manner. The optics may assist in directing emitted light in a desired direction, such as toward the middle seating assembly.

Still referring to FIG. 6, the cover 78 is configured to nest within the perimeter wall 100 such that a gap 148 may be formed between the perimeter lip 92 of the cover 78 and the perimeter wall 100 of the compartment 74. In some examples, light may spill through the gap 148 when the first light source 140 is illuminated. In some instances, a first light guide 150 may be coupled to the perimeter lip 92 of the cover 78. The first light guide 150 may utilize the first light source 140, or the first light guide 150 may have a third light source configured specifically to illuminate the first light guide 150. In other embodiments, the cover 78 may include luminescent material 10 disposed around the perimeter of the cover 78 such that the excitation light 24 may excite the luminescent material 10 to luminesce. Further, other lights and/or sunlight through a window may cause the luminescent material 10 to luminesce.

As further shown in FIG. 6, the cover 78 may include indicia 152 to indicate the location of the seatbelt stowage assembly 70, or any other desired information and/or symbols. In some instances, the indicia 152 may include a second light guide 156. The light guide 156 may utilize the first light source 140, or the light guide 156 may have a third light source configured specifically to illuminating the light guide 156. The first and second light guides 150, 156 may be formed from a rigid material that is comprised of a curable substrate such as a polymerizable compound, a mold in clear (MIC) material or mixtures thereof. Acrylates are also used for forming rigid light pipes, as well as poly methyl methacrylate (PMMA), which is a known substitute for glass. A polycarbonate material may also be used in an injection molding process to form the rigid first and second light guides 150, 156. Further, the first and second light guides 150, 156 may be a flexible light guide, wherein a suitable flexible material is used to create the first and second light guides 150, 156. Such flexible materials include urethanes, silicone, thermoplastic polyurethane (TPU), or other like optical grade flexible materials. Whether the first and second light guides 150, 156 are flexible or rigid, the first and second light guides 150, 156, when formed, are substantially optically transparent and/or translucent and capable of transmitting excitation light 24. The first and second light guides 150, 156 may be referred to as a light pipe, a light plate, a light bar or any other light carrying or transmitting substrate made from a clear or substantially translucent material. In some examples, the indicia 152 may include or be defined by the luminescent structure such that the indicia 152 is excited by the spillover light around the cover 78, the sunlight, and/or other vehicle lights. The indicia 152 may be in any shape that indicates the use of the stowage assembly such as, for example, the shape of the seatbelt webbing 108 when fastened or the shape of the seatbelt tongue 118.

With respect to the embodiments described herein, the light source 140 and any other light sources (e.g. a vehicle light 32) utilized with the seatbelt stowage assembly 70 may each be configured to emit non-visible light, such as blue light, ultraviolet (UV) light, infrared light (IR), and/or violet light and may include any form of light source. For example fluorescent lighting, light emitting diodes (LEDs), organic LEDs (OLEDs), polymer LEDs (PLEDs), solid-state lighting, or any other form of lighting configured to emit excitation light 24 may be utilized. With respect to the above examples, a controller may modify the intensity of the emitted first and second wavelengths of emitted light by pulse-width modulation or current control.

With further reference to FIGS. 5 and 6, a switch 174 may be operably coupled with the light source 140. The switch 174 may be configured as a capacitive switch that is disposed on a portion of the seatbelt stowage assembly 70. The capacitive switch 174 includes one or more capacitive sensors 178 and interconnecting electrode lead lines 182 that may be disposed on the rim portion 72. The capacitive sensors 178 and electrical lead lines 182 may be formed of a printed conductive ink or indium tin oxide (ITO) which may be made of a visibly transparent ink, according to some examples. The conductive elements of the capacitive sensors 178 and electrical lead lines 182 may be formed of copper such as flexible copper circuitry, according to other embodiments. The capacitive sensors 178 are formed of first and second electrodes 184, 186 each having electrode fingers 188. It will be appreciated that the capacitive sensor 178 may be disposed in any practicable location on the vehicle without departing from the scope of the present disclosure. The capacitive sensors 178 each provide a capacitive sense activation field 170 to sense contact or close proximity (e.g., within one mm) of a user (e.g., hand 200) in relation to the corresponding capacitive sensor. The capacitive sense activation field 170 of each capacitive sensor 178 detects a user's hand 200 which has electrical conductivity and dielectric properties that cause a change or disturbance in the capacitive sense activation field 170 as should be evident to those skilled in the art. It will be appreciated that any other type of switch may be utilized without departing from the scope of the present disclosure According to various examples, a seatbelt stowage assembly is disclosed. The seatbelt stowage assembly includes a housing including an outer rim and a cover and defining a compartment. The housing is disposed within a headliner of a vehicle and is configured to house a seatbelt in a stowed position. A light source is disposed within the compartment. Examples of the seatbelt stowage assembly can include any one or a combination of the following features:
  the stowage assembly is positioned above a rear seat;
  the cover is operably coupled to the compartment;
  the cover includes a reflective icon;
  the cover includes a pin spot and light emitted by a light source is transmitted therethrough;
  the cover includes a light guide;
  the light source is controlled by a switch;
  the light source operates as ambient light;
  the light source may be automatically activated;
  the light source is deactivated when the seatbelt is in a latched position; and/or
  the intensity of excitation light emitted by the light source is variable.

According to some examples, a seatbelt stowage assembly is disclosed. The seatbelt stowage assembly includes a housing defining a compartment disposed within a vehicle. The compartment is configured to house a seatbelt in a stowed position. A cover assembly is operably coupled to the compartment. A light source is disposed within the compartment and is operable through a control switch. Examples of the seatbelt stowage assembly can include any one or a combination of the following features:
  the seatbelt is deployed from the housing to a latched position;
  the light source is deactivated when the seatbelt is in the latched position;
  the cover assembly further includes a cover plate; a reflective icon on the cover plate; a pin spot opening defined by the cover plate; and an interior light guide coupled with the cover plate; and/or
  the control switch is automated.

According to various examples, a seatbelt stowage assembly is disclosed. The seatbelt stowage assembly includes a housing defining a compartment disposed within a vehicle. A cover plate is coupled to the compartment. A light guide is disposed around a periphery of the cover plate. A light source is disposed within the compartment. A control system is configured to vary the intensity of excitation light emitted from the light source. The compartment is configured to house a seatbelt in a stowed position. Examples of the seatbelt stowage assembly can include any one or a combination of the following features:
  the cover assembly further includes a reflective icon disposed on an exterior surface of the cover plate;
  the cover plate is separated from an outer rim of the housing by a gap, and excitation light emitted by the light source is transmitted through the gap; and/or
  a reflective material is disposed around the periphery of the cover plate.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably coupleable" to each other to achieve the desired functionality. Some examples of operably coupleable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seatbelt stowage assembly comprising:
    a housing including an outer rim and a cover and defining a compartment, wherein the housing is disposed within a headliner of a vehicle and configured to house a seatbelt in a stowed position; and
    a light source disposed within the compartment.

2. The seatbelt stowage assembly of claim 1, wherein the stowage assembly is positioned above a rear seat.

3. The seatbelt stowage assembly of claim 1, wherein the cover is operably coupled to the compartment.

4. The seatbelt stowage assembly of claim 1, wherein the cover includes a reflective icon.

5. The seatbelt stowage assembly of claim 1, wherein the cover includes a pin spot and light emitted by the light source is transmitted therethrough.

6. The seatbelt stowage assembly of claim 1, wherein the cover includes a light guide.

7. The seatbelt stowage assembly of claim 1, wherein the light source is controlled by a switch.

8. The seatbelt stowage assembly of claim 1, wherein the light source operates as ambient light.

9. The seatbelt stowage assembly of claim 1, wherein the light source may be automatically activated.

10. The seatbelt stowage assembly of claim 9, wherein the light source is be deactivated when the seatbelt is in a latched position.

11. The seatbelt stowage assembly of claim 1, wherein an intensity of excitation light emitted by the light source is variable.

12. A seatbelt stowage assembly comprising:
    a housing defining a compartment disposed within a vehicle, wherein the compartment is configured to house a seatbelt in a stowed position;
    a cover assembly operably coupled to the compartment; and
    a light source disposed within the compartment and operable through a control switch.

13. The seatbelt stowage assembly of claim 12, wherein the seatbelt is deployed from the housing to a latched position.

14. The seatbelt stowage assembly of claim 13, wherein the light source is deactivated when the seatbelt is in the latched position.

15. The seatbelt stowage assembly of claim 12, wherein the cover assembly further includes:
    a cover plate;
    a reflective icon on the cover plate;
    a pin spot defined by the cover plate; and
    an interior light guide coupled with the cover plate.

16. The seatbelt stowage assembly of claim 12, wherein the control switch is automated.

17. A seatbelt stowage assembly comprising:
    a housing defining a compartment disposed within a vehicle, the compartment configured to house a seatbelt in a stowed position;
    a cover plate coupled to the compartment;
    a light guide disposed around a periphery of the cover plate;
    a light source disposed within the compartment; and
    a control system configured to vary an intensity of excitation light emitted from the light source.

18. The seatbelt stowage assembly of claim 17, wherein the cover plate further includes a reflective icon disposed on an exterior surface of the cover plate.

19. The seatbelt stowage assembly of claim 18, wherein the cover plate is separated from an outer rim of the housing by a gap, and excitation light emitted by the light source is transmitted through the gap.

20. The seatbelt stowage assembly of claim 19, wherein a reflective material is disposed around the periphery of the cover plate.

* * * * *